US009646154B2

(12) United States Patent
Chen et al.

(10) Patent No.: US 9,646,154 B2
(45) Date of Patent: May 9, 2017

(54) RETURN ORIENTED PROGRAMMING (ROP) ATTACK PROTECTION

(71) Applicant: Microsoft Technology Licensing, LLC, Redmond, WA (US)

(72) Inventors: Ling Tony Chen, Bellevue, WA (US); Jonathan E. Lange, Seattle, WA (US); Greg M. Zaverucha, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 28 days.

(21) Appl. No.: 14/601,122

(22) Filed: Jan. 20, 2015

(65) Prior Publication Data
US 2016/0171211 A1 Jun. 16, 2016

Related U.S. Application Data

(60) Provisional application No. 62/091,365, filed on Dec. 12, 2014.

(51) Int. Cl.
*G06F 21/52* (2013.01)
*G06F 21/54* (2013.01)
*G06F 12/14* (2006.01)

(52) U.S. Cl.
CPC .......... *G06F 21/52* (2013.01); *G06F 12/1408* (2013.01); *G06F 21/54* (2013.01); *G06F 2212/1052* (2013.01); *G06F 2221/033* (2013.01)

(58) Field of Classification Search
CPC ......... H04L 29/06911; H04L 29/06925; H04L 29/06931; H04L 29/06938; G06F 21/55;
(Continued)

(56) References Cited

U.S. PATENT DOCUMENTS 5,864,707 A * 1/1999 Tran .................... G06F 9/30152
712/228
8,510,596 B1 8/2013 Gupta et al.
(Continued)

OTHER PUBLICATIONS

European Patent Office, "Notification of Transmittal of the International Search Report and the Written Opinion of the International Searching Authority," issued in PCT Application No. PCT/US2015/063559, mailed date: Feb. 29, 2016, 12 Pages.
(Continued)

*Primary Examiner* — Hadi Armouche
*Assistant Examiner* — Shahriar Zarrineh
(74) *Attorney, Agent, or Firm* — Tim Churna; Dan Choi; Micky Minhas +
(74) *Attorney, Agent, or Firm* — Return oriented programming (ROP) attack prevention techniques are described. In one or more examples, a method is described of protecting against return oriented programming attacks. The method includes initiating a compute signature hardware instruction of a computing device to compute a signature for a return address and the associated location on the stack the return address is stored and causing storage of the computed signature along with the return address in the stack. The method also includes enforcing that before executing the return instruction using the return address on the stack, initiating a verify signature hardware instruction of the computing device to verify the signature matches the target return address on the stack and responding to successful verification of the signature through execution of the verify signature hardware instruction by the computing device, executing the return instruction to the return address.

17 Claims, 10 Drawing Sheets

(58) Field of Classification Search
CPC ............... G06F 21/52; G06F 12/1408; G06F 2212/1052; G06F 2221/033
USPC ......................................................... 726/23
See application file for complete search history.

(56) References Cited

U.S. PATENT DOCUMENTS

| | | | |
|---|---|---|---|
| 8,756,582 B2 | 6/2014 | Serrano | |
| 2004/0162947 A1* | 8/2004 | Hooker | G06F 9/3004 711/132 |
| 2007/0143847 A1 | 6/2007 | Kraemer et al. | |
| 2009/0144309 A1* | 6/2009 | Cabrera Escandell | G06F 21/54 |
| 2010/0177642 A1* | 7/2010 | Sebastian | H04L 12/1859 370/248 |
| 2010/0332751 A1* | 12/2010 | Quigley | H04L 69/08 711/114 |
| 2012/0137137 A1 | 5/2012 | Brickell et al. | |
| 2013/0036464 A1* | 2/2013 | Glew | G06F 21/71 726/22 |
| 2013/0117843 A1* | 5/2013 | Komaromy | G06F 21/52 726/22 |
| 2013/0185792 A1* | 7/2013 | Balakrishnan | G06F 21/54 726/22 |
| 2013/0205389 A1* | 8/2013 | Grocutt | G06F 21/52 726/22 |
| 2014/0075556 A1* | 3/2014 | Wicherski | G06F 21/554 726/23 |
| 2014/0082327 A1* | 3/2014 | Ghose | G06F 9/3877 712/205 |
| 2014/0096245 A1 | 4/2014 | Fischer | |
| 2014/0096247 A1 | 4/2014 | Fischer | |
| 2014/0143522 A1 | 5/2014 | Saidi et al. | |
| 2014/0173290 A1 | 6/2014 | Kaplan | |
| 2014/0181976 A1 | 6/2014 | Snow et al. | |
| 2014/0283040 A1* | 9/2014 | Wilkerson | G06F 21/52 726/22 |
| 2014/0283060 A1* | 9/2014 | Beatty | G06F 21/52 726/23 |
| 2014/0380468 A1* | 12/2014 | Gerzon | G06F 21/52 726/22 |
| 2015/0040224 A1* | 2/2015 | Litva | G06F 21/554 726/23 |
| 2015/0370560 A1* | 12/2015 | Tan | G06F 9/30058 717/148 |
| 2016/0034687 A1* | 2/2016 | Rhee | G06F 21/52 726/23 |
| 2016/0094552 A1* | 3/2016 | Durham | H04L 63/0876 713/171 |

OTHER PUBLICATIONS

Weidong, Shi et al, "High efficiency counter mode security architecture via prediction and precomputation", In Proceedings of 32nd International Symposium on Computer Architecture, Jun. 4, 2005, pp. 14-24.

Carlini,"ROP is Still Dangerous: Breaking Modern Defenses", Proceedings of 23rd USENIX Security Symposium, Aug. 2014, 15 pages.

Davi,"ROPdefender: A Detection Tool to Defend Against Return-Oriented Programming Attacks", In Proceedings of 6th ACM Symposium on Information, Computer and Communications Security, Mar. 22, 2011, 12 pages.

Frantzen,"StackGhost: Hardware Facilitated Stack Protection", In Proceedings of the 10th conference on USENIX Security Symposium—vol. 10, Article 5, Aug. 13, 2001, 11 pages.

Kayaalp,"SCRAP: Architecture for Signature-Based Protection from Code Reuse Attacks", n Proceedings of the IEEE 19th International Symposium on High Performance Computer Architecture, Feb. 23, 2013, 12 pages.

Lu,"Packed, Printable, and Polymorphic Return-Oriented Programming", In Proceedings of the 14th International Conference on Recent Advances in Intrusion Detection, Sep. 20, 2011, 20 pages.

Shuo,"Prevent Kernel Return-Oriented Programming Attacks Using Hardware Virtualization", In Proceedings of the 8th international conference on Information Security Practice and Experience, Apr. 9, 2012, 9 pages.

"Written Opinion of the International Preliminary Examining Authority," issued in PCT Application No. PCT/US2015/063559, Mailed Date: Nov. 10, 2016, 8 Pages.

* cited by examiner

```
<function1>:
  :
  ComputeSignature Reg, [RSP + OffsetToRetAddrPosition]
    // Compute Sign([RSP+OffsetToRetAddrPosition],RSP+OffsetToRetAddrPosition)
    // and put into Reg regsiter
  :
  PUSH Reg // Save the signature on the stack
  :
  CALL function2
  :
  CALL function3
  :
  POP Reg // Restore signature from the stack
  :
  VerifySignature Reg, [RSP + OffsetToRetAddrPosition]
    // Compute Sign([RSP+OffsetToRetAddrPosition],RSP+OffsetToRetAddrPosition)
    // Verify that value matches that of Reg. If not, throws an exception.
  :
  RET
```

300

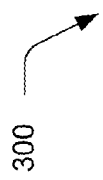

Fig. 3

RETURN ORIENTED PROGRAMMING (ROP) ATTACK PROTECTION

This application claims priority under 35 U.S.C. Section 119(e) to U.S. Provisional Application 62/091,365, filed Dec. 12, 2014, and titled "Return Oriented Programming (ROP) Attack Protection," the entire disclosure of which is hereby incorporated by reference.

BACKGROUND

A signification portion of zero-day attacks on software involve return oriented programming (ROP) attacks. In ROP attacks, a malicious party gains control of a stack, also known as a call stack, to assume control of the software to execute machine instruction sequences, called gadgets. By specifying a sequence of gadget execution, the malicious party can then take control of the computing device as desired.

SUMMARY

Return oriented programming (ROP) attack prevention techniques are described. In one or more examples, a method is described of protecting against return oriented programming attacks, the method comprising initiating a compute signature hardware instruction of a computing device to compute a signature for a return address and an associated location on a stack at which the return address is stored; enforcing that before executing the return instruction using the return address on the stack, initiating a verify signature hardware instruction of the computing device to verify the signature matches the target return address; and responding to successful verification of the signature through execution of the verify signature hardware instruction by the computing device, executing the return instruction to the return address.

In one or more examples, a computing device is configured to protect against return oriented programming (ROP) attacks, the computing device comprising: a processing system having hardware configured to execute instructions stored in memory and having hardware configured to perform: a compute signature hardware instruction to compute a signature for a return address and an associated location on a stack at which the return address is stored; and a verify signature hardware instruction to verify the signature; and the memory configured to maintain an operating system that is executable by the processing system as the instructions, the operating system configured to protect against return oriented programming (ROP) attacks through functionality to initiate the compute signature hardware instruction to compute the signature for the return address and the associated location on the stack the return address is stored and initiate the verify signature hardware instruction to verify the signature before executing the return instruction using the return address on the stack.

In one or more examples, one or more computer-readable storage media have instructions stored thereon that, responsive to execution by one or more computing devices, causes the one or more computing device to implement a compiler to generate machine code that causes the compute signature hardware instruction to compute a signature for a return address and the associated location on a stack at which the return address is stored and to cause a verify signature hardware instruction to be executed before a return instruction to verify the signature.

In one or more examples, a method is described to efficiently generate a signature to protect against return oriented programming (ROP) attacks by a computing device. The method includes generating the signature for a return address and the associated location on the stack the return address is stored, the signature generation includes generating a universal hash value by hashing the return address and a return address position of the return address in the stack and exclusive or that universal hash value with a secure one time pad. One way to generate the one-time pad is to use a block cipher such as AES in counter mode. The signature is stored along with the return address in the stack or in a hardware register to enable the system to verification of the signature later on before the return instruction.

In one or more examples, a method is described to efficiently generate signatures to protect against return oriented programming (ROP) attacks by a computing device. The method includes generating a plurality of secure one-time pads based on counter values, building a call cache having the plurality of one-time pads arranged according to respective counter values, responding to use of said one-time pad from the call cache to generate a respective signature, moving said one-time pad from the call cache to a return cache, and responding to use of said one-time pad from return cache to verify the respective signature, removing said one-time pad from the return cache.

In one or more examples, a processing system is configured to efficiently generate signatures to protect against return oriented programming (ROP) attacks. The processing system includes hardware to perform a compute signature hardware instruction to compute a signature for a return address and the associated location on the stack the return address is stored by generating a universal hash value from the return address and the return address position of the return address in the stack and exclusive or the hash value with a secure one-time pad and hardware to perform a verify signature hardware instruction to verify the signature.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 3 depicts examples of functions that employ the signature as part of verification of a return address as part of a return instruction.

DETAILED DESCRIPTION

Overview

Figure 1:
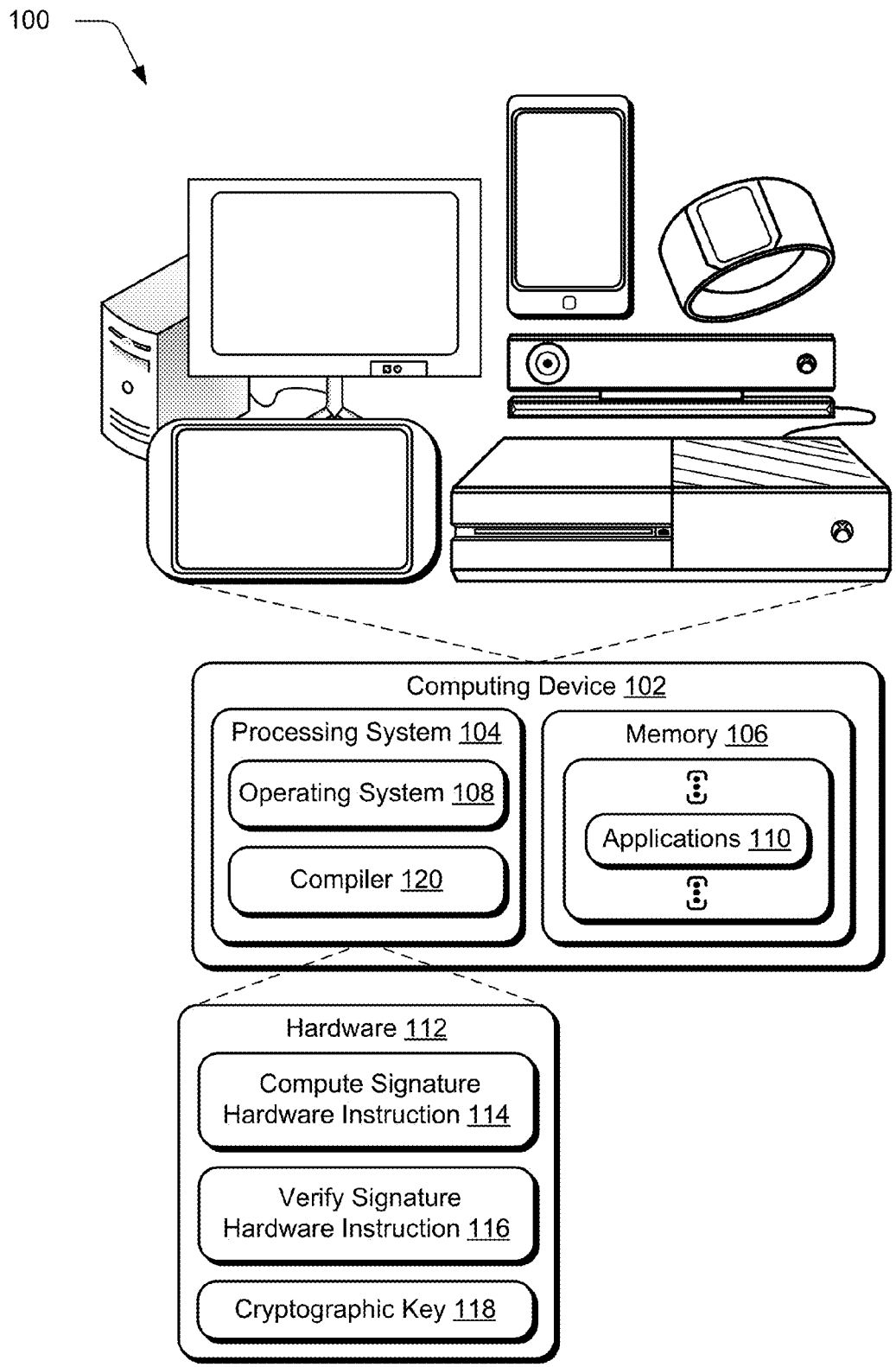
FIG. 1 is an illustration of an environment in an example implementation that is operable to employ return oriented programming (ROP) attack protection techniques described herein.

Return oriented programming (ROP) attacks are a significant problem involving computer security. These attacks leverage a vulnerability in which the stack is writable and contains a return address that is jumped to during a return (RET) instruction. Therefore, a malicious party may take advantage of this and overwrite the stack and thereby make the computing device jump to code that is specified by the malicious party.

Accordingly, return oriented programming (ROP) attack protection techniques are described. In one or more implementations, a signature of the return address and the location of the return address in a stack is stored in the stack along with the return address. The signature is used to verify the return address and thus limit the return instruction to only return to the original intended destination, thereby protecting from use by malicious parties.

The signature is generated in hardware of the computing device (e.g., as part of the processing system) using a compute signature hardware instruction. Verification of the signature is also performed in hardware of the computing device, in this case using a verify signature hardware instruction. Cryptographic keys are used during the signature calculation and the keys are always kept in hardware. In this way, cryptographic keys and other information are not exposed outside of the hardware and are thus protected from access by malicious parties. This makes it hard for the malicious party to compute a valid signature for a malicious return address destination. Any secure keyed MAC (Machine authentication Code) operation can be used to compute the signature of the return address and the return address location on the stack, and in one such example a scheme is described that can be used to make the signature be computable in a performant way.

Additionally, techniques are also described to quickly calculate the signature, thereby preserving performance of the computing device as well as minimizing the intrusiveness of the addition of the signature to verify the return instruction. For example, the signature is calculated through use of one-time pads that are combined (e.g., via an exclusive OR operation) with a hash (e.g., Universal Hash) of the return address and a location of the return address in a stack. The one time-pads could be calculated using counter mode of a block cipher (such as Advanced Encryption Standard (AES)) using an incrementing counter value as the input to counter mode to generate the one-time pad value. Because block ciphers are typically complicated and slow to compute, the one-time pads could be pre-computed and stored in call cache and thereby are readily available for computation of the signature without waiting to compute the one-time pads. A return cache is also used to store the one-time pads values for signature verification. In this way, the techniques described herein are usable to protect against return oriented programming (ROP) attacks without having an adverse effect on performance of the computing device. Further discussion of these and other examples is described in the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ return oriented programming (ROP) attack protection techniques described herein. The illustrated environment 100 includes a computing device 102, which is configurable in a variety of ways.

For example, the computing device 102 may be configured as a computer that is capable of communicating over a network, such as a desktop computer, a mobile station, an entertainment appliance, a set-top box communicatively coupled to a display device, a wireless phone, a game console, a wearable device, and so forth. Thus, the computing device 102 ranges from full resource devices with substantial memory and processor resources (e.g., personal computers, game consoles) to low-resource devices with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations such as by a web service, a remote control and set-top box combination, an image capture device and a game console configured to capture gestures, and so on.

The computing device 102 is illustrated as including a variety of hardware components, examples of which include a processing system 104 and an example of a computer-readable storage medium illustrated as memory 106. The processing system 104 is representative of functionality to perform operations through execution of instructions stored in the memory 106. The processing system 104, for instance, may include a plurality of cores that are each configured to independently execute program instructions. Although illustrated separately, functionality of these components may be further divided, combined (e.g., on an application specific integrated circuit), and so forth.

The computing device 102 is further illustrated as including an operating system 108. The operating system 108 is configured to abstract underlying functionality of the computing device 102 to applications 110 that are executable on the computing device 102. For example, the operating system 108 may abstract processing system 104, memory 106 and other hardware functionality of the computing device 102 such that the applications 110 may be written without knowing "how" this underlying functionality is implemented. The application 110, for instance, may provide data to the operating system 108 to be rendered and displayed by a display device or printer without understanding how this rendering will be performed. The operating system 108 may also represent a variety of other functionality, such as to manage a file system and user interface that is navigable by a user of the computing device 102.

The processing system 104 is also illustrated as including hardware 112, e.g., components of an integrated circuit or on-chip system, an application-specific integrated circuit (ASIC), and other implementations in silicon or other hardware. The hardware 112 in this instance is configured to perform a compute signature hardware instruction 114 and a verify signature hardware instruction 116. The compute signature hardware instruction 114 is configured to generate a signature that is usable by the verify signature hardware instruction to verify whether a return instruction is to be performed. This may be performed through use of a cryptographic key 118 that is randomly generated per boot-up and stored in the hardware 112 such that the cryptographic key 118 is not exposed outside the hardware 112 and thus protected against access by malicious parties. Through use of the signature, the malicious party cannot make the computing device 102 jump to a desired location by overwriting the stack because the malicious party does not have access to the cryptographic key 118 that is stored in the hardware 112 and thus cannot derive what the signature for a malicious return location would be.

Functionality of the hardware instructions is accessible in a variety of ways. For example, the operating system 108 may abstract this functionality to applications 110 executed by the processing system 104. In another example, a compiler 120 may be coded to make this functionality available as part of the applications 110 themselves, e.g. make the machine code generated by the compiler issue the compute signature and verify signature instructions at the appropriate location in code to make sure all return addresses are checked before a return instruction. A variety of other examples are also contemplated. Further discussion of use of signatures in conjunction with a return address stored on the stack is described in the following and shown in a corresponding figure.

Figure 2:
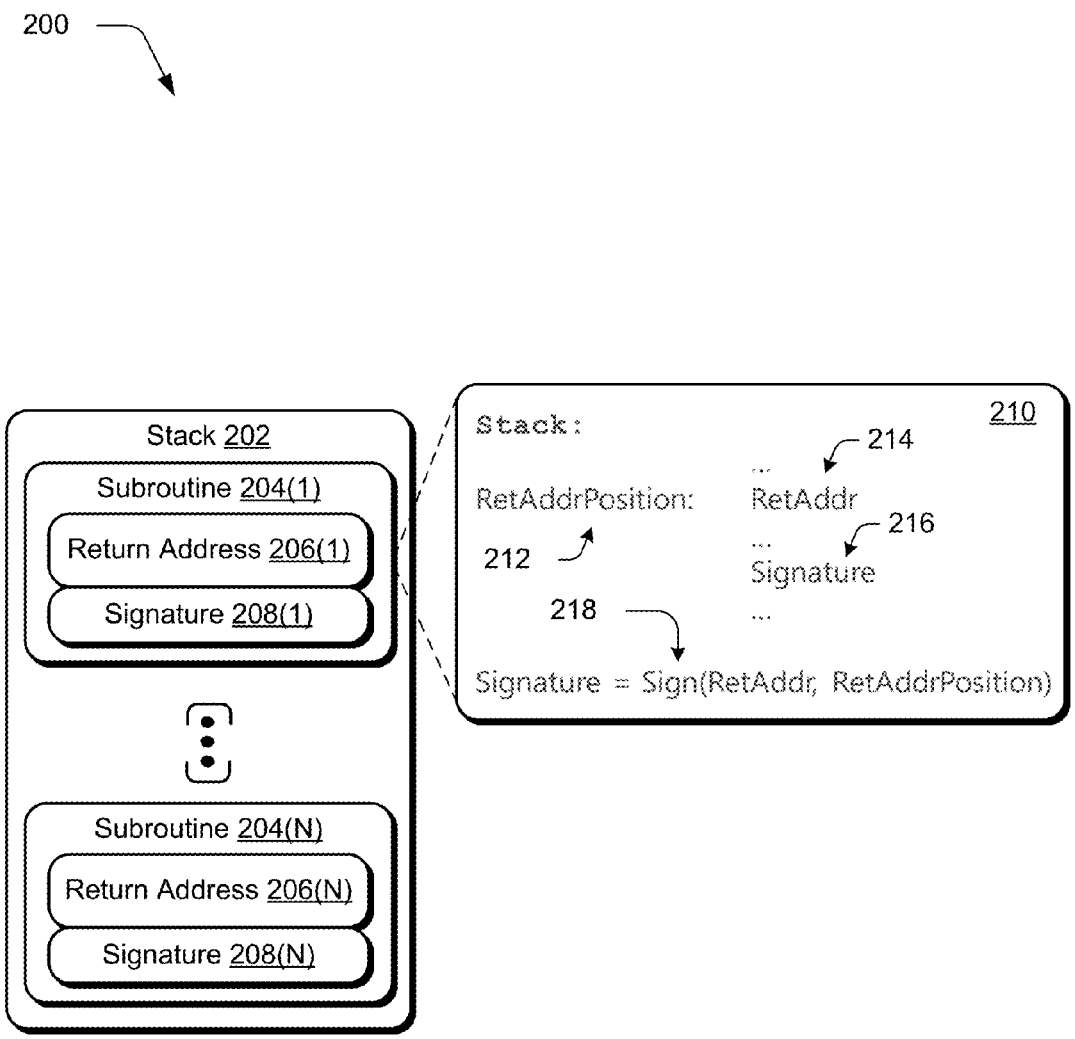
FIG. 2 depicts an example implementation of a stack of a computing device of FIG. 1.

FIG. 2 depicts an example implementation 200 of a stack 202 of the computing device 102 of FIG. 1. The stack 202 is a data structure that stores information about active subroutines 204(1)-204(N) of software being executed by the processing system 104 of the computing device 102. The stack 202 is also known as a call stack, execution stack, control stack, run-time stack, and machine stack.

The stack 202 is used to keep track of a point at which each of the active subroutines 204(1)-204(N) is to return control when finished executing by the processing system 104. In order to do this, each of the subroutines 204(1)-204(N) includes a respective return address 206(1)-206(N) that is used as part of a return instruction to indicate where to return.

Return-oriented programming (ROP) attacks manipulate the stack 202 by taking advantage of vulnerabilities that enable the attacker to overwrite the stack. An example of such a vulnerability is a buffer overrun. In a buffer overrun, an amount of data is accepted that is greater than a space allotted in the stack 202 and thus overflows to overwrite the return address 206(1). The overwritten return address then diverts control to other gadgets desired by a malicious party as previously described. Other software vulnerabilities may allow manipulation of the stack in a similar manner.

Accordingly, the return-oriented programming (ROP) attack prevention techniques described herein utilize signatures 208(1)-208(N) that are associated with respective return addresses 206(1)-206(N) in the stack 202. The signatures 208(1)-208(N) are usable to verify the return address 206(1)-206(N) and thus performance of the return instruction as previously described. An example of a signature is shown at 210. In this example 210, a return address position 212 in the stack 202 is shown that has the return addresses 214 and the signature 216.

The sign function 218 is formed in this example through application of a cryptographic key 118 on the return address and the return address position. As previously described, the cryptographic key 118 is contained within hardware 112 and not exposed and as such a malicious party cannot make the computing device 102 jump to a desired location due to inaccessibility of the cryptographic key 118 in hardware 112. Further discussion of generation of the signature is described in relation to FIG. 4A and use of the signature as part of verification is described in relation to FIG. 4B.

FIG. 3 depicts an example 300 of a function (function1) that employs the signature as part of verification of a return address. The machine language used in this example is AMD64 and RSP represents the stack pointer register in the AMD64 instruction set. Two new machine instructions are added into the HW to enable this signature functionality: ComputeSignature and VerifySignature. In function1, a ComputeSignature instruction is added at the beginning of the function to compute the signature. In order for the instruction to do this, it needs to know where on the stack 202 the return address is located which, in this example, is at RSP+OffsetToRetAddrPosition. The compiler determines the OffsetToRetAddrPosition and makes sure the right value is placed in the instruction. The ComputeSignature instruction also stores the computed signature. In the example, the signature is placed in a HW register (Reg). A future machine instruction can then push the signature value onto the stack (illustrated by the "PUSH Reg" instruction in the example).

Later on, before the RET instruction is executed, the machine code can POP the value of the signature back into a HW Register (Reg) and perform a VerifySignature instruction to check that the signature value of Sign([RSP+OffsetToRetAddrPosition], RSP+OffsetToRetAddrPosition) really matches the previously saved signature value in Reg. If the signature does not match, the HW will throw an exception and halt execution of the program. Only if the signature matches will the program proceed to execute the return instruction (RET). By adding these extra instructions at the beginning and end of the function, it is not possible for code flaws in function1 as well as function2 and function3 to be exploited to overwrite the stack and make the system return to a malicious location during the RET instruction. The VerifySignature instruction catches the fact that the signature does not match the new malicious return address and prevents the return from ever happening.

Note that saving the signature on the stack is not required. If function1 is a "leaf" function that doesn't make further calls (function2 and function3 in the example), then the PUSH and POP instructions to save Reg on the stack is not required as long as the register Reg is not modified between the ComputeSignature and VerifySignature instructions.

Figure 4A:
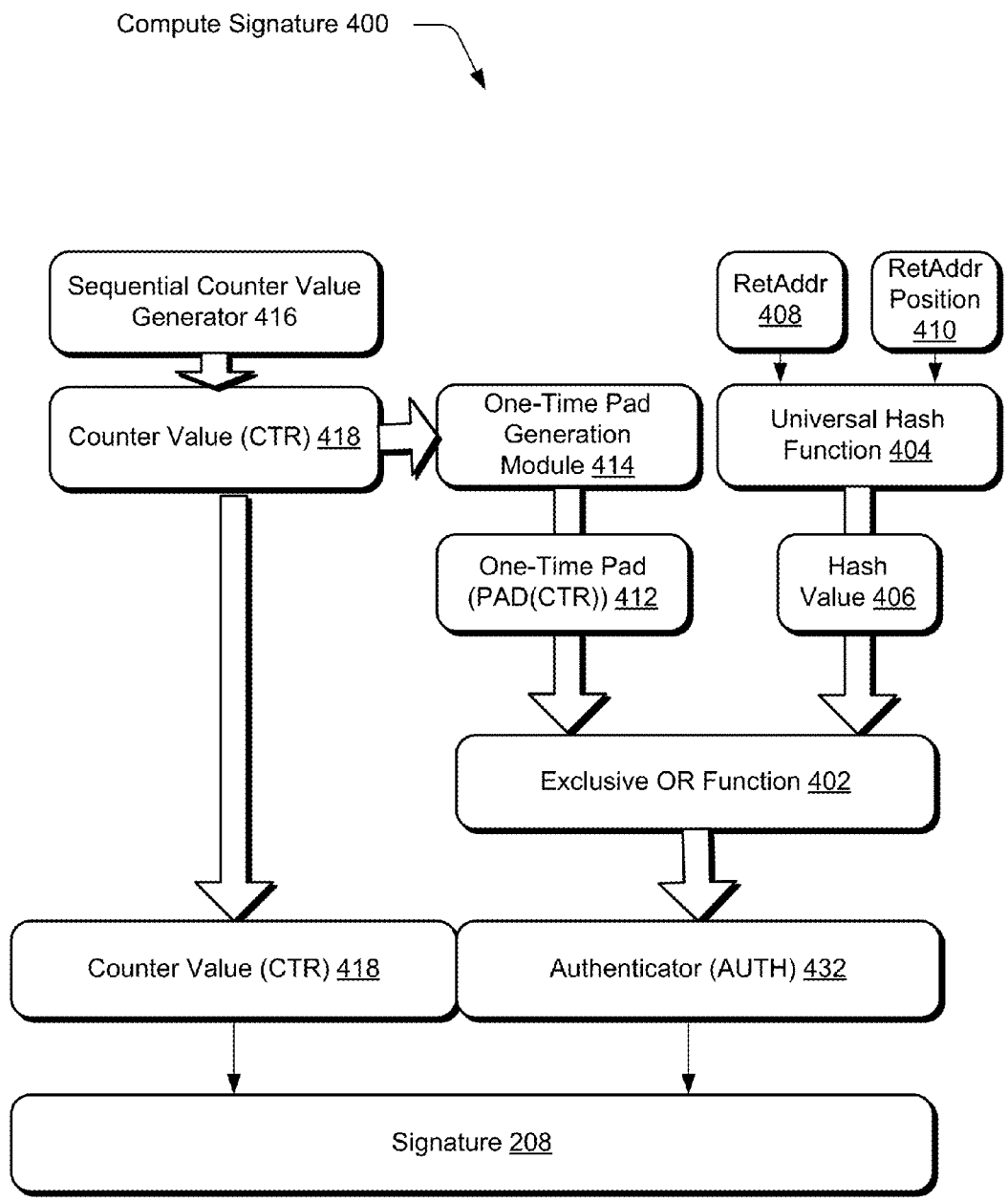
FIG. 4A depicts a system that is configured to generate a signature using hardware of FIG. 1.

FIG. 4A depicts a system 400 that is configured to compute signatures using the hardware 112 of FIG. 1. In this example, the signature calculation is implemented in hardware 112 of the computing device 102 of FIG. 1 to generate a signature 208 that is associated with the return address 206 in the stack 202 of FIG. 2. The signature 208 is constructed using a variety of different inputs.

As illustrated, a universal hash function 404 is utilized to calculate a hash value 406 based on the return address 408 and the position of the return address on the stack 410. A variety of different universal hash functions 404 may be used to compute the hash value 406. Universal hashing refers to a class of hash function such that for each pair of inputs, the probability is low that a randomly chosen function from the class resulted in that pair colliding. Universal hash functions that hash short inputs have efficient hardware implementations.

The hash value 406 is combined with a one-time pad 412 generated by a one-time pad generation module 414, using an exclusive OR (XOR) operation 402. The result of the exclusive OR operation is the authenticator (AUTH) 432 and is part of the signature 208. The one-time pad generation 414 may be done in a variety of ways, such as using a block cipher (e.g. Advanced Encryption Standard (AES)) in counter mode to generate the one-time pad values.

A Sequential Counter value generator 416 is used to generate counter values. The generator starts at 0 at boot time, and is incremented by 1 each time a new counter value is desired. The generated counter value (CTR) 418 is fed into the one-time pad as well as being placed in the signature 208 such that when the signature is verified the counter value is extracted and used to generate the exact same one-time pad value.

The signature 208 in this example is a concatenation of the counter value (CTR) 418 with the authenticator (AUTH) 432. A design decision may be made as to how many bits are used for the CTR versus the AUTH in a signature. For example, if the signature needs to be 64 bits, then one possible allocation is to use 48 bits for the CTR and 16 bits for the AUTH. Using too few bits for the CTR might result in it rolling back to 0 again during a boot session which would no longer guarantee that the one-time pad value is really just used "one-time", and thus enable an attacker to possible break the system.

Figure 4B:
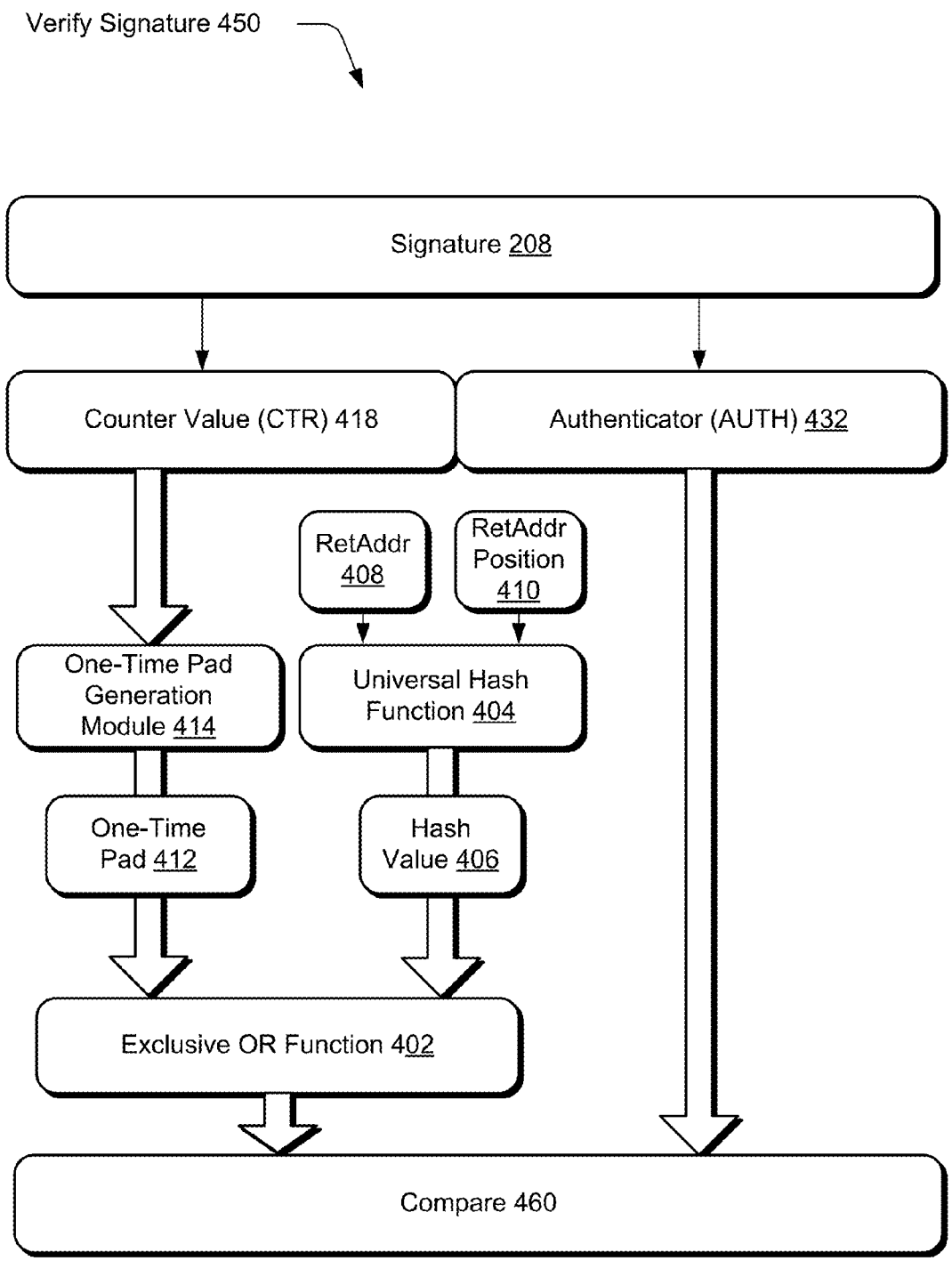
FIG. 4B depicts a system that is configured to verify a signature using hardware of FIG. 1.

FIG. 4B illustrates how verify signature 450 could be done to verify the signature generated by the previous compute signature 400 system. The signature 208 is first separated into the CTR 418 part and the AUTH 432 part based on the number of bits allocated for each purpose (e.g. 48/16). The CTR is fed to the one-time pad generator while the return address 408 that is to be verified and return address position on the stack 410 is fed to the universal hash function just like it was during compute signature. The exclusive OR output 402 of the Hash value 406 and the one-time pad value 412 is compared (460) with the AUTH 432 value that came in the signature 208. If the 2 values match exactly, the signature is good and the following RET instruction is allowed to proceed. If the values don't match the return address or signature must have been tampered with and the RET is not allowed.

An example of a universal hash function 404 could be: Hash(RetAddr,RetAddrPosition)=(((Low32(RetAddr)+key1)*(High32(RetAddr)+key2)+(Low32(RetAddrPosition)+key3)*(High32(RetAddrPosition)+Key4)), in which "key1," "key2," "key3," and "key4" are random 32-bit words made up at boot time and all operations are on 32-bit values over the field $GF(2^{32})$. The advantage of such a universal hash function is that it can be very quickly computed in hardware.

An example of an implementation for the one-time pad generation module 414 could be to use the AES block cipher in counter mode to generate the one-time pad values. In such an implementation, a random AESKey is made up at boot time and kept in hardware. The AESKey is used as the AES key to encrypt the CTR value and the result of the encryption is used as the one time pad.

The values of AESkey, Key1, Key2, Key3, Key4 in the above examples are kept in the hardware 112 as was previous described as cryptographic key 118 in FIG. 1. Because the calculation of the one-time pad (abbreviated as PAD(CTR)) requires an AES operation and can take a significant number of processing cycles, techniques are employed to minimize the intrusion of this time consumption on normal operation of the computing device 102, an example of which is described in the following and shown in a corresponding figure.

Figure 5:
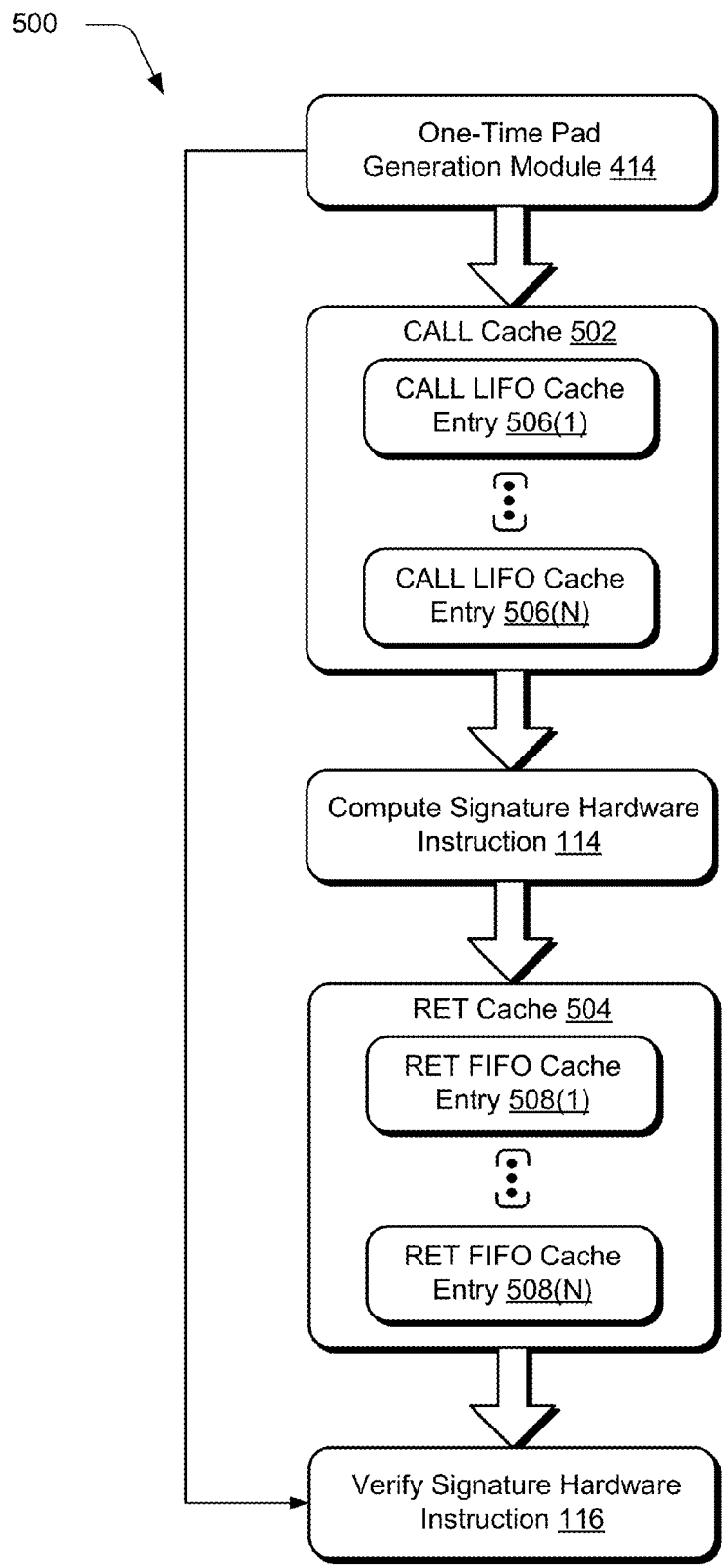
FIG. 5 depicts an example system in which caches are used to minimize a performance hit in calculation of one-time pads.

FIG. 5 depicts an example system 500 in which caches are used to minimize a performance hit in calculation of one-time pads. In order to make generation of the signature performant for both initial generation and verification, a CALL cache 502 and a RET cache 504 are used to store pairs of CTR and PAD(CTR) generated by the one-time pad generation module 414. The CALL cache is used to store one time pad values for use during compute signature, and the RET cache is used to store one time pad values used during verify signature. For example, the CALL cache 502 can include a plurality of Last In First Out (LIFO) Cache entries 506(1)-506(N) that contain (CTR, PAD(CTR)) pairs for quick one-time pad lookup based on CTR, i.e., the counter value 418.

As previously described, for instance, the counter values 418 are incremented sequentially for each compute signature operation and thus these values may be pre-computed ahead of time before the compute signature operation to improve efficiency in generation of the signature by the compute signature hardware instruction 114. Thus, the CALL cache 502 is readily populated as CTR is a simple counter that increments by one for each compute signature operation. The cached PAD values are then sequentially consumed form the CALL cache 502 as compute signature operations are performed.

Once a compute signature operation consumes a one-time PAD from the CALL cache 502, the (CTR (PAD (CTR)) pair is moved to the RET cache 504. The RET cache 504 is used in a first-in/first-out (FIFO) manner which is illustrated through use of a plurality of RET FIFO cache entries 508(1)-508(N). In practice, it is expected that a majority of the cache hits to the RET cache 504 involve a top of the FIFO stack and thus the hardware 112 may be optimized to account for this. Once a one-time pad value is accessed in the RET cache 504, it can be removed from the RET cache.

During task switching, or a series of a significant number of RETs, the RET cache 504 may become invalidated or depleted. Accordingly, a fallback may be performed to redo the one-time pad generation 414 step to re-compute the one-time pad value, which is illustrated through use of an arrow directly from the one-time pad generation module 414 to the verify signature hardware instruction 116. In this way, the system can still be able to securely verify the signature is correct and guard against a ROP attack in this case where the RET cache does not have the appropriate one time pad value, but the performance will be worse than a cache hit on the RET cache since the block cipher (AES) will need to be repeated to obtain the one time pad value which could take some time.

Example Procedures

The following discussion describes return oriented programming (ROP) attack prevention techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the figures described above.

Functionality, features, and concepts described in relation to the examples of FIGS. 1-5 may be employed in the context of the procedures described herein. Further, functionality features, and concepts described in relation to different procedures below may be interchanged among the different procedures and are not limited to implementation in the context of an individual procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples.

Figure 6:
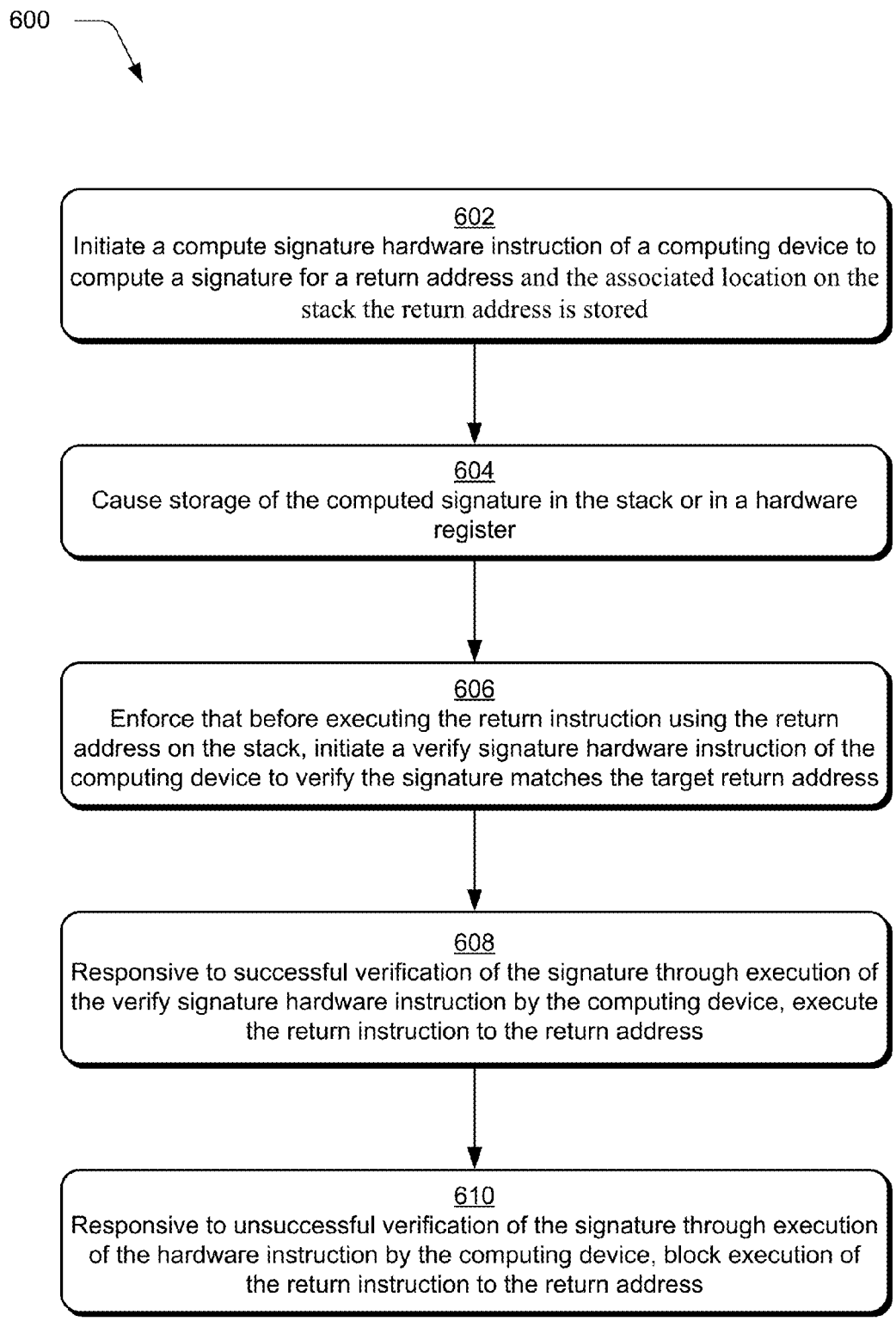
FIG. 6 is a flow diagram depicting a procedure in an example implementation in which techniques are described for protecting against return oriented programming attacks.

FIG. 6 depicts a procedure 600 in an example implementation in which techniques are described for protecting against return oriented programming attacks. A compute signature hardware instruction of a computing device is initiated to compute a signature for a return address and the associated location on the stack the return address is stored (block 602). The signature is either stored in the stack or a hardware register (block 604). The compute signature hardware instruction 114, for instance, is initiated to compute a signature 208(1) that is stored in a stack 202 along with a return address 206(1) or a return instruction. Note that the compute signature operation could either happen because the compiler placed the instruction in the called function, or it could implicitly be performed by the hardware due to a CALL being made.

Before executing the return instruction using the return address on the stack, a verify signature hardware instruction of the computing device is initiated to verify the signature of the target return address (block 606). Note that the signature verification can either happen because the compiler placed the instruction to verify signature before the return instruction, or the HW could make it implicitly happen as part of the RET instruction. Responding to successful verification of the signature through execution of the verify signature hardware by the computing device, the return instruction is executed to transfer control to the return address (block 608). In this way, the verify signature hardware 116 is usable to verify whether the return address has been tampered with based on whether a re-computation of the signature by the verify signature hardware 116 matches the stored signature.

Figure 7:
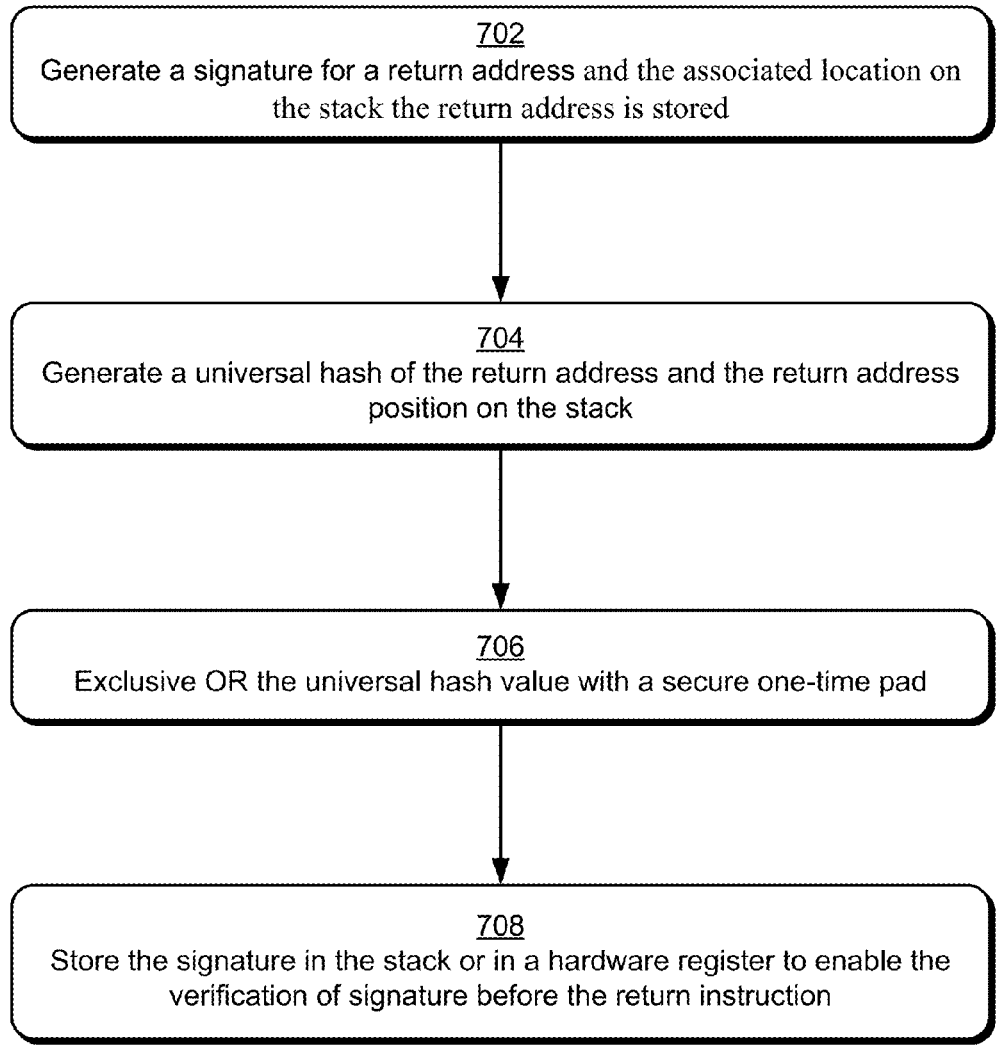
FIG. 7 is a flow diagram depicting a procedure in an example implementation in which a technique is used to compute a signature usable to verify a return address for use as part of a return instruction.

FIG. 7 depicts a procedure 700 in an example implementation in which a technique is used to compute a signature usable to verify a return address for use as part of a return instruction. A signature is generated for a return address and the associated location on the stack the return address is stored (block 702). For example, a hash value is generated from a universal hash of the return address and the return address position of the return address in the stack (block 704). The hash value is exclusive ORed with a secure one-time pad (block 706). The one-time pad value could be generated based on a counter value and a block cipher (e.g. AES) operating in counter mode.

The signature is stored in the stack or in a hardware register to enable the return instruction to verify the signature (block 708). A verify signature hardware instruction 116, for instance, may compare the stored signature with a signature computed by the instruction to verify the return address, and if a match is made, the return instruction is executed using that return address and blocked if not.

Figure 8:
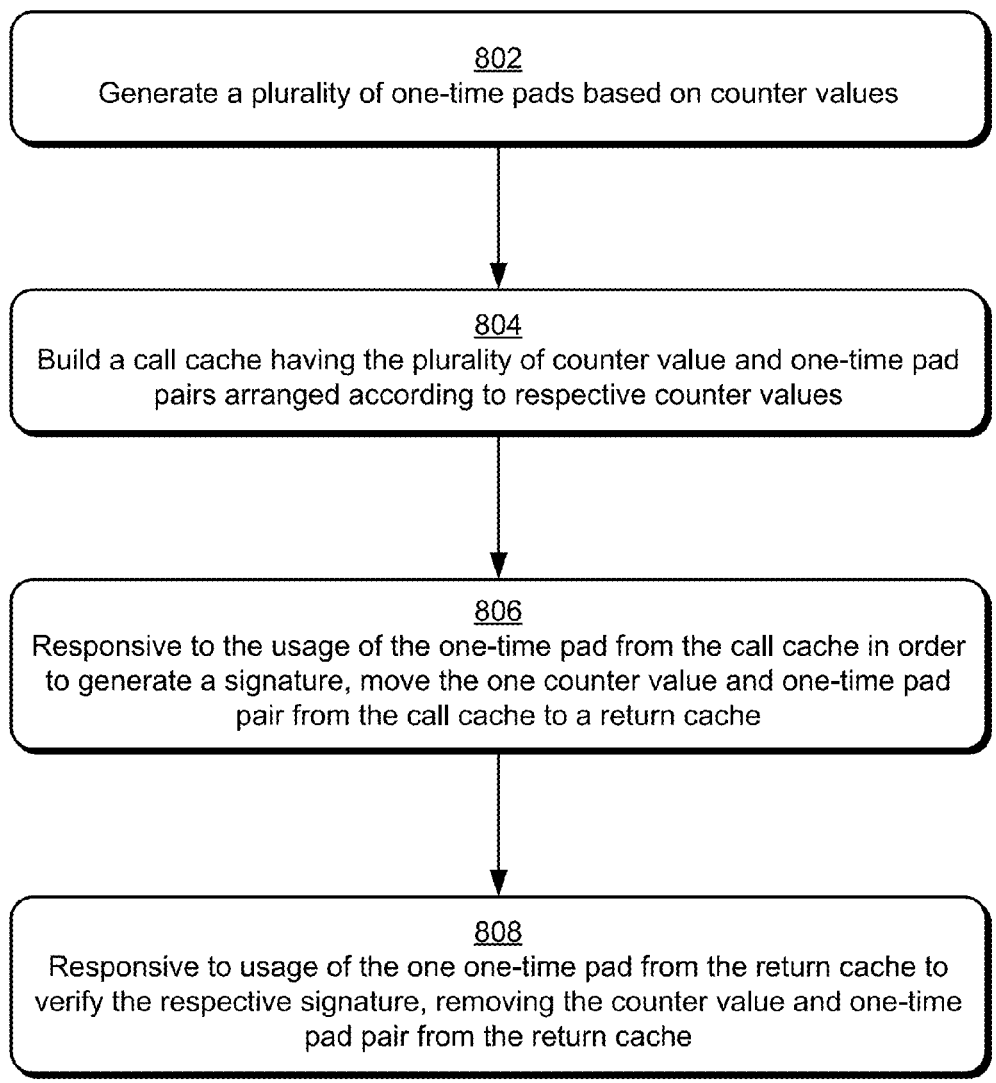
FIG. 8 is a flow diagram depicting a procedure in an example implementation in which caches are leveraged to improve efficiency in generation of a signature usable to verify a return address for use as part of a return instruction.

FIG. 8 depicts a procedure 800 in an example implementation in which caches are leveraged to improve efficiency in generation of a signature usable to verify a return address for use as part of a return instruction. A plurality of one-time pads are generated based on respective counter values and a block cipher operating in counter mode (block 802). A call cache is built having the plurality of one-time pads arranged according to respective counter values (block 804). A one-time pad generation module 414, for instance, may generate a plurality of one-time pads for inclusion in a CALL cache 502 arranged according to the respective counter values used to generate the pads.

Responding to use of the one-time pad from the call cache to generate a respective signature, the one-time pad is moved from the call cache to a return cache (block 806). The one-time pad in this example is used as part of the compute signature hardware instruction 114 to compute a signature that is stored in the stack 202 as associated with the return address.

Responding to use of the one-time pad from the return cache to verify the respective signature to limit the return instruction to only return to the original intended destination, the one-time pad is removed from the return cache (block 808). Continuing with the previous example, the verify signature hardware instruction 116 accesses the RET cache 504 to get the one-time pad used to compute the signature to compare with the signature stored in the stack or hardware register to verify whether the return instruction is to be permitted or denied and thus protect against return oriented programming (ROP) attacks.

Example System and Device

Figure 9:
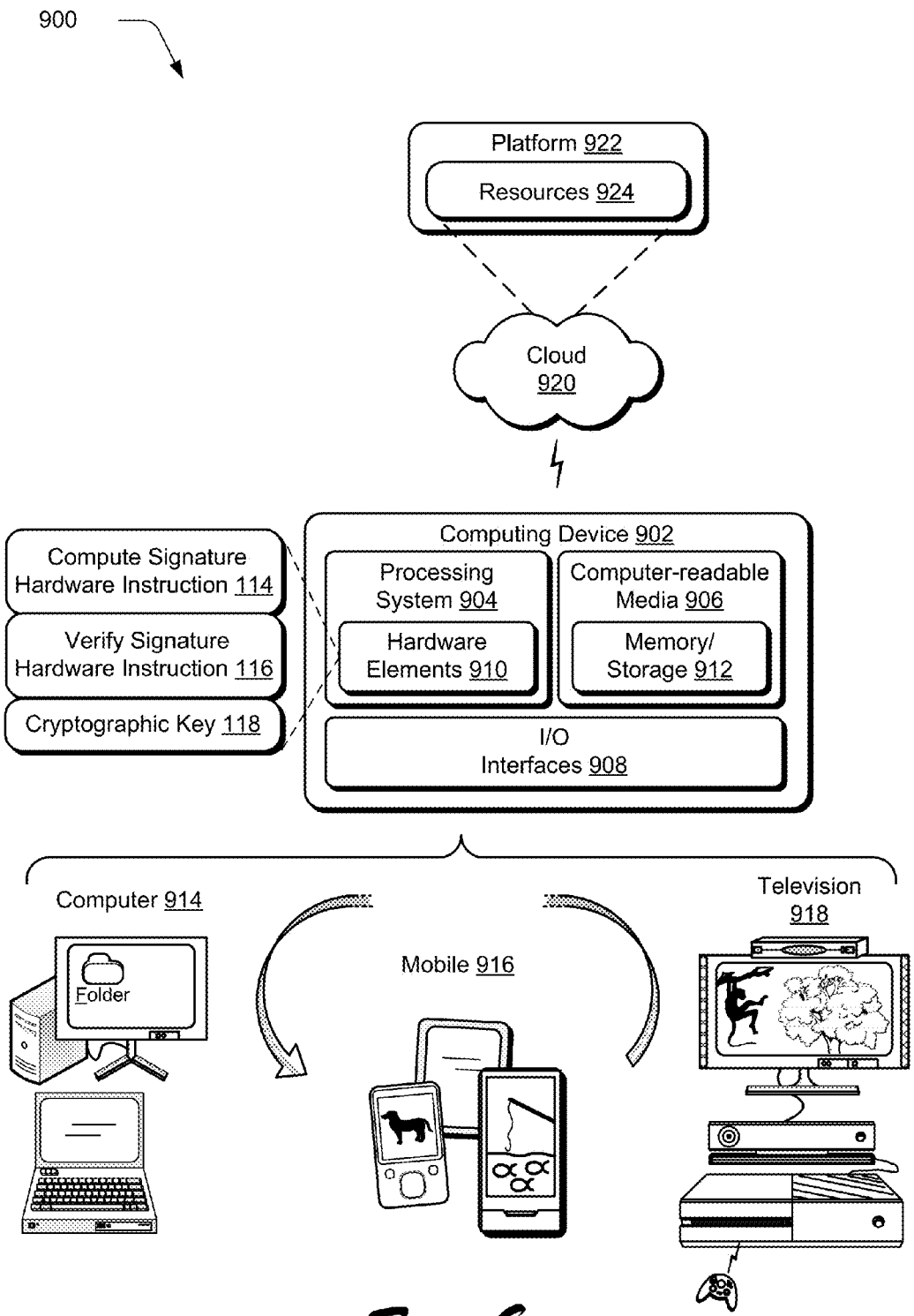
FIG. 9 illustrates an example system including various components of an example device that can be implemented as any type of computing device as described with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein as illustrated through inclusion of the computer signature hardware instruction 114, verify signature hardware instruction 116, and cryptographic key 118. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 902 may assume a variety of different configurations, such as for computer 914, mobile 916, and television 918 uses. Each of these configurations includes devices that may have generally different constructs and capabilities, and thus the computing device 902 may be configured according to one or more of the different device classes. For instance, the computing device 902 may be implemented as the computer 914 class of a device that includes a personal computer, desktop computer, a multi-screen computer, laptop computer, netbook, and so on.

The computing device 902 may also be implemented as the mobile 916 class of device that includes mobile devices, such as a mobile phone, portable music player, portable gaming device, a tablet computer, a multi-screen computer, and so on. The computing device 902 may also be implemented as the television 918 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. This functionality may also be implemented all or in part through use of a distributed system, such as over a "cloud" 920 via a platform 922 as described below.

The cloud 920 includes and/or is representative of a platform 922 for resources 924. The platform 922 abstracts underlying functionality of hardware (e.g., servers) and software resources of the cloud 920. The resources 924 may include applications and/or data that can be utilized while computer processing is executed on servers that are remote from the computing device 902. Resources 924 can also include services provided over the Internet and/or through a subscriber network, such as a cellular or Wi-Fi network.

The platform 922 may abstract resources and functions to connect the computing device 902 with other computing devices. The platform 922 may also serve to abstract scaling of resources to provide a corresponding level of scale to encountered demand for the resources 924 that are implemented via the platform 922. Accordingly, in an interconnected device embodiment, implementation of functionality described herein may be distributed throughout the system 900. For example, the functionality may be implemented in part on the computing device 902 as well as via the platform 922 that abstracts the functionality of the cloud 920.

CONCLUSION AND EXAMPLE IMPLEMENTATIONS

Example implementations described herein include, but are not limited to, one or any combinations of one or more of the following examples:

In one or more examples, a method is described of protecting against return oriented programming attacks, the method comprising initiating a compute signature hardware instruction of a computing device to compute a signature for a return address and an associated location on a stack at which the return address is stored; enforcing that before executing the return instruction using the return address on the stack, initiating a verify signature hardware instruction of the computing device to verify the signature matches the target return address; and responding to successful verification of the signature through execution of the verify signature hardware instruction by the computing device, executing the return instruction to the return address.

A method as described alone or in combination with any of the above or below examples, in which the signature is utilized to sign the return address and a combination of the return address and the associated location.

A method as described alone or in combination with any of the above or below examples, further comprising responding to unsuccessful verification of the signature through execution of the hardware instruction by the computing device by blocking execution of the return instruction to the return address.

A method as described alone or in combination with any of the above or below examples, in which the compute signature hardware instruction causes the signature to be computed using a secure keyed MAC algorithm where a cryptographic key is randomly generated per boot and stored in hardware of the computing device and not exposed to software executed by the computing device.

A method as described alone or in combination with any of the above or below examples, in which the signature is computed using a one-time pad that is combined with a hash of the return address and the return address position of the return address in the stack.

A method as described alone or in combination with any of the above or below examples, in which the hash is universal hash and the combination is formed using an exclusive OR (XOR) operation.

A method as described alone or in combination with any of the above or below examples, in which the one-time pad is generated using a counter value and a block cipher operating in counter mode using the counter value as input.

A method as described alone or in combination with any of the above or below examples, in which the block cipher is based on the Advanced Encryption Standard (AES).

A method as described alone or in combination with any of the above or below examples, in which the counter value is included as a portion of the signature.

A method as described alone or in combination with any of the above or below examples, in which the one-time pad values are cached in hardware.

A method as described alone or in combination with any of the above or below examples, in which the cached one-time pad values are stored in at least two separate caches, one of which for use during compute signature as a CALL cache and one for use during verify signature as a RET cache.

A method as described alone or in combination with any of the above or below examples, in which entries in the CALL cache are moved to the RET cache upon successful usage to compute the signature.

A method as described alone or in combination with any of the above or below examples, in which entries in the RET cache are removed upon successful usage to verify the signature.

A method as described alone or in combination with any of the above or below examples, in which the CALL cache is a LIFO queue and the RET cache is a FIFO stack.

In one or more examples, a computing device is configured to protect against return oriented programming (ROP) attacks, the computing device comprising: a processing system having hardware configured to execute instructions stored in memory and having hardware configured to perform: a compute signature hardware instruction to compute a signature for a return address and an associated location on a stack at which the return address is stored; and a verify signature hardware instruction to verify the signature; and the memory configured to maintain an operating system that is executable by the processing system as the instructions, the operating system configured to protect against return oriented programming (ROP) attacks through functionality to initiate the compute signature hardware instruction to compute the signature for the return address and the associated location on the stack the return address is stored and initiate the verify signature hardware instruction to verify the signature before executing the return instruction using the return address on the stack.

A computing device as described in claim 15, wherein the compute signature hardware instruction causes the signature to be computed using a secure keyed MAC algorithm where a cryptographic key is randomly generated per boot and stored in hardware of the computing device and not exposed to software executed by the computing device.

A computing device as described alone or in combination with any of the above or below examples, in which the signature is computed using a one-time pad that is combined with a hash of the return address and the return address position of the return address in the stack.

In one or more examples, one or more computer-readable storage media have instructions stored thereon that, responsive to execution by one or more computing devices, causes the one or more computing device to implement a compiler to generate machine code that causes the compute signature hardware instruction to compute a signature for a return address and the associated location on a stack at which the return address is stored and to cause a verify signature hardware instruction to be executed before a return instruction to verify the signature.

One or more computer-readable storage media as described alone or in combination with any of the above or below examples, in which the compute signature hardware instruction causes the signature to be computed using a secure keyed MAC algorithm where a cryptographic key is randomly generated per boot and stored in hardware of the computing device and not exposed to software executed by the computing device.

One or more computer-readable storage media as described alone or in combination with any of the above or below examples, in which the signature is computed using a one-time pad that is combined with a hash of the return address and the return address position of the return address in the stack.

In one or more examples, a method is described to efficiently generate a signature to protect against return oriented programming (ROP) attacks by a computing device. The method includes generating the signature for a return address and the associated location on the stack the return address is stored, the generating including generating a hash value from a hash of the return address and a return address position of the return address in the stack and processing the hash value with a one-time pad. The signature is stored along with the return address in the stack to control execution of the return instruction through verification of the signature.

A method as described alone or in combination with any of the above or below examples, in which the hash is performed using a Universal Hash Function.

A method as described alone or in combination with any of the above or below examples, in which the processing is performed using an Exclusive OR (XOR) operation.

A method as described alone or in combination with any of the above or below examples, in which the generating is performed by the computing device through execution of a compute signature hardware instruction in hardware of the computing device.

A method as described alone or in combination with any of the above or below examples, in which the verification of the signature is configured to be performed by the computing device through execution of a verify signature hardware instruction in hardware of the computing device.

A method as described alone or in combination with any of the above or below examples, in which the one-time pad is generated using a cryptographic key that is randomly generated per boot and stored in hardware of the computing device.

A method as described alone or in combination with any of the above or below examples, in which the cryptographic key is formed through application of an Advance Encryption Standard (AES) key on a counter value.

A method as described alone or in combination with any of the above or below examples, in which the signature is further generated using an identifier of a core of a processing system of the computing device that includes a counter that generated the counter value.

A method as described alone or in combination with any of the above or below examples, in which the one-time pad is selected from a call cache having a plurality of one-time pads that are pre-computed and stored in the call cache.

A method as described alone or in combination with any of the above or below examples, in which the one-time pad is moved from the call cache to a return cache for use as part of a verify signature hardware instruction to verify the signature after computation of the signature.

In one or more examples, a method is described to efficiently generate signatures to protect against return oriented programming (ROP) attacks by a computing device. The method includes generating a plurality of one-time pads based a respective counter values and an encryption operation, building a call cache having the plurality of one-time pads arranged according to respective counter values, responding to use of at least one said one-time pad from the call cache to generate a respective said signature, moving the at least one said one-time pad from the call cache to a return cache, and responding to use of at least one said one-time pad from return cache to verify the respective said signature to limit the return instruction to only return to the original intended destination, removing the at least one said one-time pad from the return cache.

A method as described alone or in combination with any of the above or below examples, in which the encryption operation is an AES operation.

A method as described alone or in combination with any of the above or below examples, in which the respective counter values are incremented sequentially for each call made to a counter and the encryption operation is performable for a plurality of said calls at once.

A method as described alone or in combination with any of the above or below examples, in which the generating and the building are performed offline and are not responding to a request to generate a particular said signature.

A method as described alone or in combination with any of the above or below examples, in which the verification of the respective said signature is performed using a hardware instruction.

In one or more examples, a processing system is configured to efficiently generate signatures to protect against return oriented programming (ROP) attacks. The processing system includes hardware to perform a compute signature hardware instruction to compute a signature for a return address and the associated location on the stack the return address is stored by generating a hash value from a hash of the return address and a return address position of the return address in the stack and process the hash value with a one-time pad and hardware to perform a verify signature hardware instruction to verify the signature.

A processing system as described alone or in combination with any of the above or below examples, in which the hash is performed using a Universal Hash Function.

A processing system as described alone or in combination with any of the above or below examples, in which the processing is performed using an Exclusive OR (XOR) operation.

A processing system as described alone or in combination with any of the above or below examples, in which the one-time pad is generated using a cryptographic key that is randomly generated per boot and stored in the hardware.

A processing system as described alone or in combination with any of the above or below examples, in which the one-time pad is selected from a call cache having a plurality of one-time pads that are pre-computed and stored in the call cache and wherein the one-time pad is moved from the call cache to a return cache for use as part of the verify signature hardware instruction after computation of the signature using the compute signature hardware instruction.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A method of protecting against return oriented programming attacks, the method comprising:
    initiating a compute signature hardware instruction of a computing device to compute a signature for a return address and an associated location on a stack at which the return address is stored, wherein the signature is computed using a one-time pad that is combined with a hash of the return address and the return address position of the return address in the stack, and wherein the one time pad value is stored in at least two separate hardware caches, one cache for use during compute signature as a call cache and one cache for use during verify signature as a return cache;
    enforcing that before executing the return instruction using the return address on the stack, initiating a verify signature hardware instruction of the computing device to verify the signature matches the target return address; and
    responding to successful verification of the signature through execution of the verify signature hardware instruction by the computing device, executing the return instruction to the return address.

2. A method as described in claim 1, wherein the signature is utilized to sign the return address and a combination of the return address and the associated location.

3. A method as described in claim 1, further comprising responding to unsuccessful verification of the signature through execution of the hardware instruction by the computing device by blocking execution of the return instruction to the return address.

4. A method as described in claim 1, wherein the compute signature hardware instruction causes the signature to be computed using a secure keyed MAC algorithm where a cryptographic key is randomly generated per boot and stored in hardware of the computing device and not exposed to software executed by the computing device.

5. A method as described in claim 1, wherein the hash is universal hash and the combination is formed using an exclusive OR (XOR) operation.

6. A method as described in claim 1, wherein the one-time pad is generated using a counter value and a block cipher operating in counter mode using the counter value as input.

7. A method as described in claim 6, wherein the block cipher is based on the Advanced Encryption Standard (AES).

8. A method as described in claim 6, wherein the counter value is included as a portion of the signature.

9. A method as described in claim 1, wherein entries in the call cache are moved to the return cache upon successful usage to compute the signature.

10. A method as described in claim 1, wherein entries in the return cache are removed upon successful usage to verify the signature.

11. A method as described in claim 1, wherein the call cache is a LIFO queue and the return cache is a FIFO stack.

12. A computing device configured to protect against return oriented programming (ROP) attacks, the computing device comprising:
    a processing system having hardware configured to execute instructions stored in memory and having hardware configured to perform:
        a compute signature hardware instruction to compute a signature for a return address and an associated location on a stack at which the return address is stored, wherein the signature is computed using a one-time pad that is combined with a hash of the return address and the return address position of the return address in the stack, and wherein the one time pad value is stored in at least two separate hardware caches, one cache for use during compute signature as a call cache and one cache for use during verify signature as a return cache; and
        a verify signature hardware instruction to verify the signature; and
    the memory configured to maintain an operating system that is executable by the processing system as the instructions, the operating system configured to protect against return oriented programming (ROP) attacks through functionality to initiate the compute signature hardware instruction to compute the signature for the return address and the associated location on the stack the return address is stored and initiate the verify signature hardware instruction to verify the signature before executing the return instruction using the return address on the stack.

13. A computing device as described in claim 12, wherein the compute signature hardware instruction causes the signature to be computed using a secure keyed MAC algorithm where a cryptographic key is randomly generated per boot and stored in hardware of the computing device and not exposed to software executed by the computing device.

14. A computing device as described in claim 12, wherein the signature is computed using the one-time pad value that is combined with a hash of the return address and the return address position of the return address in the stack.

15. One or more computer-readable storage devices having instructions stored thereon that, responsive to execution by one or more computing devices, causes the one or more computing devices to:
  initiate a compute signature hardware instruction of a computing device to compute a signature for a return address and an associated location on a stack at which the return address is stored, wherein the signature is computed using a one-time pad that is combined with a hash of the return address and the return address position of the return address in the stack, and wherein the one time pad value is stored in at least two separate hardware caches, one cache for use during compute signature as a call cache and one cache for use during verify signature as a return cache;
  enforce that before executing the return instruction using the return address on the stack, initiating a verify signature hardware instruction of the computing device to verify the signature matches the target return address; and
  respond to successful verification of the signature through execution of the verify signature hardware instruction by the computing device, executing the return instruction to the return address.

16. One or more computer-readable storage devices as described in claim 15, wherein the compute signature hardware instruction causes the signature to be computed using a secure keyed MAC algorithm where a cryptographic key is randomly generated per boot and stored in hardware of the computing device and not exposed to software executed by the computing device.

17. One or more computer-readable storage devices as described in claim 15, wherein the signature is computed using the one-time pad value that is combined with a hash of the return address and the return address position of the return address in the stack.

* * * * *